(12) United States Patent
Jadhav et al.

(10) Patent No.: US 11,442,620 B2
(45) Date of Patent: Sep. 13, 2022

(54) METHOD AND DEVICE PROVIDING MULTIMODAL INPUT MECHANISM

(71) Applicant: Tata Consultancy Services Limited, Mumbai (IN)

(72) Inventors: Charudatta Jadhav, Mumbai (IN); Shubham Agarwal, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/375,218

(22) Filed: Jul. 14, 2021

(65) Prior Publication Data
US 2022/0035520 A1 Feb. 3, 2022

(30) Foreign Application Priority Data

Jul. 29, 2020 (IN) .............................. 202021032478

(51) Int. Cl.
*G06F 3/0482* (2013.01)
*G06F 3/04883* (2022.01)
(Continued)

(52) U.S. Cl.
CPC .......... *G06F 3/04883* (2013.01); *G06F 3/016* (2013.01); *G06F 3/16* (2013.01); *G06F 2203/0381* (2013.01)

(58) Field of Classification Search
CPC ...... G06F 3/0488; G06F 3/0482; G06F 3/167; G06F 3/04883; G06F 3/016;
(Continued)

(56) References Cited

U.S. PATENT DOCUMENTS

| | | | | |
|---|---|---|---|---|
| 2010/0125816 A1* | 5/2010 | Bezos | ..................... | G06F 3/017 715/863 |
| 2012/0290526 A1* | 11/2012 | Gupta | .................. | G06K 9/6293 706/52 |

(Continued)

OTHER PUBLICATIONS

Khamis, Mohamed et al., "GazeTouchPass: Multimodal Authentication Using Gaze and Touch on Mobile Devices", ACM SIGCHI Conference on Human Factors in Computing Systems, May 2016, pp. 2156-2164, ACM, https://researchgate.net/pubiication/294705226_GazeTouchPass_Multimodal_Authentication_Using_Gaze_and_Touch_on_Mobile_Devices/link/59f90580a6fdcc075ec99dcb/download.

(Continued)

*Primary Examiner* — Michael J Eurice
(74) *Attorney, Agent, or Firm* — Finnegan, Henderson, Farabow, Garrett & Dunner LLP

(57) ABSTRACT

Conventional input mechanisms available are built considering majority users but face usability and security challenge when used by special users or when used in challenging environments. Embodiments herein provide a method and device for multimodal input mechanism. The device is preconfigured for a plurality of modalities and provides an option to a user to select an input modality pair for entering a sequence of characters into the device. A first modality among the pair enables selection of a character set among a plurality of character sets and the second modality enables selecting a character from the selected character set. The plurality of modalities comprise a touch mode defined by a set of touch based gestures, a motion keyboard mode defined by a set of device tilt based gestures, an air gesture mode defined by a set of virtual gestures and a voice mode defined by a set of voice commands. The input modality pair from among the plurality of input modalities is selected by the user based on physical constraints of the user and environ- (Continued)

mental constraints posed by an environment around the device.

12 Claims, 7 Drawing Sheets

(51) Int. Cl.
*G06F 3/01* (2006.01)
*G06F 3/16* (2006.01)

(58) Field of Classification Search
CPC .............. G06F 3/04842; G06F 3/017; G06F 2203/0381; G06F 1/1694; G06F 3/16; G06F 3/044; G06F 3/0304; G06F 1/1688
See application file for complete search history.

(56) References Cited

U.S. PATENT DOCUMENTS

| | | | | |
|---|---|---|---|---|
| 2013/0046544 A1* | 2/2013 | Kay | ........................ | G06F 3/023 345/169 |
| 2013/0053007 A1* | 2/2013 | Cosman | .................. | G06F 3/017 455/414.3 |
| 2019/0114021 A1* | 4/2019 | Oliver | ................. | G06F 3/04166 |
| 2021/0349627 A1* | 11/2021 | Chang | ................... | G06F 3/0482 |

OTHER PUBLICATIONS

Bianchi, Andrea et al, "The Secure Haptic Keypad: A Tactile Password System", Computer Science, Jan. 2010, pp. 1089-1092, ACM, http://www.whereveriam.org/work/UMa/note0689-Bianchi.pdf.

Gesu India, "TouchPIN: Numerical Passwords You Can Feel", Designing accessible interface for password entry for blind smartphone users, Sep. 2017, Research Gate, https://www.researchgate.net/publicatton/329758413_TouchPIN_Numerical_Passwords_You_Can_Feel/link/5c19371c92851c22a33490ac/download.

Dumas, Bruno et al., "Design Guidelines for Adaptive Multimodal Mobile Input Solutions", International Conference on Human-Computer Interaction with Mobile Devices and Services, Aug. 2013, pp. 285-294, ACM, https://www.researchgate.net/publication/238974859_Design_Guidelines_for_Adaptive_Multimodal_Mobile_Input_Solutions/link/0c96051a927f16da08000000/download.

Dim, Nem Khan et al., "Designing Motion Gesture Interfaces in Mobile Phones for Blind People", Journal of Computer Science and Technology, Sep. 2014, pp. 812-824, Springer, https://jcst.ict.ac.cn/EN/10.1007/s11390-014-1470-5.

* cited by examiner

METHOD AND DEVICE PROVIDING MULTIMODAL INPUT MECHANISM

PRIORITY CLAIM

This U.S. patent application claims priority under 35 U.S.C. § 119 to: Indian Application No. 202021032478, filed on Jul. 29, 2020. The entire contents of the aforementioned application are incorporated herein by reference.

TECHNICAL FIELD

The embodiments herein generally relate to device input mechanisms and, more particularly, to a method and device for multimodal input mechanism.

BACKGROUND

There has been tremendous research and development in device technology with higher processing capabilities, communication technologies supported with 24x7 internet. Thus, devices are considered to be a digital assistant for any user. Similarly, the devices such as smartphones bundled with accessibility contribute as a key player in improving the quality of life of visually impaired (VI) users or physically disabled persons. These digital assistants may store Personally identifiable information (PII) of the user and function as a gateway to various critical services such as banking, sensitive information access and so on. Thus, it is required that the device access or any information entered by the user into the device should be secured against an imposter trying to grab such sensitive information for malpractice. Also, to enhance the usability aspect across different type of users, input mechanism of the device should consider or provide multiple options to the user so that he/she can select the input mechanism according to his/her convenience and security needs. For any input mechanism, it is equally important to provide an indication or feedback to the user about the information entered, so as to ensure correctness of the same. For example, Visually Impaired (VI) users face several usability and security challenges while entering information such as 'password' into the device. From the security angle, there is a constant threat of observation attacks (shoulder surfing, peeping-into-the-phone, overhearing, eavesdropping, spy camera, etc.). Mechanisms such as voice support, where device screen readers provide feedback in audio to read out the text displayed on the screen are available but are not secure as can be heard by others around. Further, noisy environments are additional challenge in voice based input and feedback mechanisms. For these reasons, the VI users do not prefer to access their accounts such as Facebook™, Gmail™, and internet banking, etc. in public places. Also, shoulder surfing to follow the keys pressed on the keyboard is also common. Other than security aspect, the physically disabled person, for example having disability in his hand has challenges accessing conventional keyboard or popular touch screen based interfaces.

Thus, conventional input mechanisms available are built considering the majority users but face usability and security challenge when used by special users or when used in challenging environments.

SUMMARY

Embodiments of the present disclosure present technological improvements as solutions to one or more of the above-mentioned technical problems recognized by the inventors in conventional systems. For example, in one embodiment, a method for multimodal input mechanism is provided.

The method comprises detecting an event triggered by a user from a device to receive a sequence of characters selected from a plurality of characters through the multimodal input mechanism, wherein the plurality of characters comprises a combination of alphanumeric and special characters, and wherein the plurality of characters are divided into a plurality of character sets.

The method further comprises activating the multimodal input mechanism on detection of the event, the multimodal input mechanism comprising: providing an option to the user to select an input modality pair from among a plurality of modalities, wherein the input modality pair comprises a first modality and a second modality, and wherein the plurality of modalities are preconfigured in the device and comprise a touch mode defined by a set of touch based gestures, a motion keyboard mode defined by a set of device tilt based gestures, an air gesture mode defined by a set of virtual gestures and a voice mode defined by a set of voice commands.

Furthermore, the multimodal input mechanism comprises setting: a) the first modality for selecting a character set among the plurality of character sets defined for the multimodal input mechanism; and b) the second modality for inserting a character among a plurality of characters from the character set selected by the user.

Furthermore, the multimodal input mechanism comprises receiving the sequence of plurality of characters by enabling user to insert each character of the sequence, wherein inserting each character comprises: a) enabling user to select the character set to which each character belongs on detecting a first modality gesture among a set of first modality gestures defined for the first modality corresponding to each of the plurality of character sets, wherein a first predefined vibration pattern, providing a haptic response to user, indicates the character set that is currently available for selection; and b) enabling the user to select the character corresponding to each of the plurality characters on detecting a second modality gesture among a set of second modality gestures of the second modality defined for each of the plurality of character in the selected character set, wherein a second vibration pattern, providing the haptic response to the user, indicates the character from the selected character set that is currently available for selection.

In another aspect, a device for multimodal input mechanism is provided. The device comprises a memory storing instructions; one or more Input/Output (I/O) interfaces; and one or more hardware processors coupled to the memory via the one or more I/O interfaces, wherein the one or more hardware processors are configured by the instructions to detect an event triggered by a user from a device to receive a sequence of characters selected from a plurality of characters through the multimodal input mechanism, wherein the plurality of characters comprise a combination of alphanumeric and special characters, and wherein the plurality of characters are divided into a plurality of character sets.

Further, the multimodal input mechanism is activated on detection of the event, the multimodal input mechanism comprising: providing an option to the user to select an input modality pair from among a plurality of modalities, wherein the input modality pair comprises a first modality and a second modality, and wherein the plurality of modalities are preconfigured in the device and comprise a touch mode defined by a set of touch based gestures, a motion keyboard mode defined by a set of device tilt based gestures, an air gesture mode defined by a set of virtual gestures and a voice mode defined by a set of voice commands.

Furthermore the multimodal input mechanism comprises setting: a) the first modality for selecting a character set among the plurality of character sets defined for the multimodal input mechanism; and b) the second modality for inserting a character among a plurality of characters from the character set selected by the user.

Furthermore the multimodal input mechanism comprises receiving the sequence of plurality of characters by enabling user to insert each character of the sequence, wherein inserting each character comprises: a) enabling user to select the character set to which each character belongs on detecting a first modality gesture among a set of first modality gestures defined for the first modality corresponding to each of the plurality of character sets, wherein a first predefined vibration pattern, providing a haptic response to user, indicates the character set that is currently available for selection; and b) enabling the user to select the character corresponding to each of the plurality characters on detecting a second modality gesture among a set of second modality gestures of the second modality defined for each of the plurality of character in the selected character set, wherein a second vibration pattern, providing the haptic response to the user, indicates the character from the selected character set that is currently available for selection.

In yet another aspect, there are provided one or more non-transitory machine-readable information storage mediums comprising one or more instructions, which when executed by one or more hardware processors causes a method providing multimodal input mechanism. The method comprises detect an event triggered by a user from a device to receive a sequence of characters selected from a plurality of characters through the multimodal input mechanism, wherein the plurality of characters comprise a combination of alphanumeric and special characters, and wherein the plurality of characters are divided into a plurality of character sets.

Further, comprises activating the multimodal input mechanism on detection of the event, the multimodal input mechanism comprising: providing an option to the user to select an input modality pair from among a plurality of modalities, wherein the input modality pair comprises a first modality and a second modality, and wherein the plurality of modalities are preconfigured in the device and comprise a touch mode defined by a set of touch based gestures, a motion keyboard mode defined by a set of device tilt based gestures, an air gesture mode defined by a set of virtual gestures and a voice mode defined by a set of voice commands.

Furthermore the multimodal input mechanism comprises setting: a) the first modality for selecting a character set among the plurality of character sets defined for the multimodal input mechanism; and b) the second modality for inserting a character among a plurality of characters from the character set selected by the user.

Furthermore the multimodal input mechanism comprises receiving the sequence of plurality of characters by enabling user to insert each character of the sequence, wherein inserting each character comprises: a) enabling user to select the character set to which each character belongs on detecting a first modality gesture among a set of first modality gestures defined for the first modality corresponding to each of the plurality of character sets, wherein a first predefined vibration pattern, providing a haptic response to user, indicates the character set that is currently available for selection; and b) enabling the user to select the character corresponding to each of the plurality characters on detecting a second modality gesture among a set of second modality gestures of the second modality defined for each of the plurality of character in the selected character set, wherein a second vibration pattern, providing the haptic response to the user, indicates the character from the selected character set that is currently available for selection.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
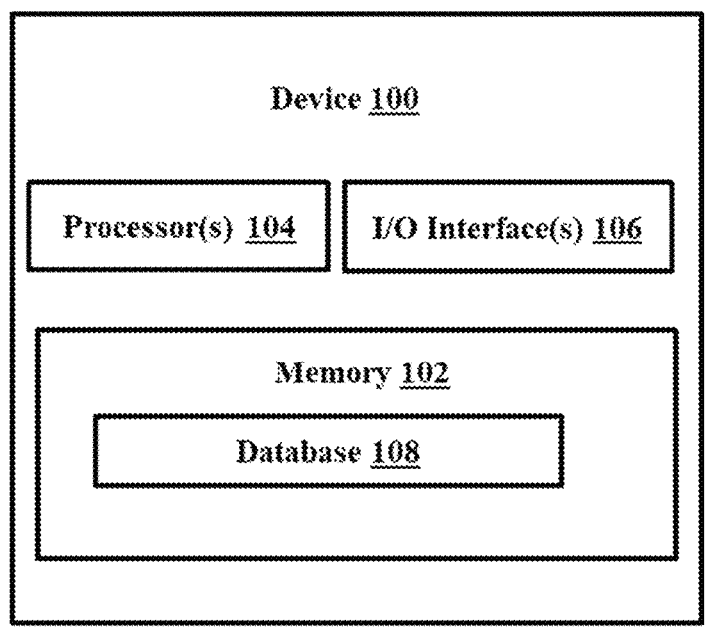
FIG. 1 is a functional block diagram of a device for multimodal input mechanism, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and device for multimodal input mechanism. The device is preconfigured for a plurality of modalities and provides an option to a user to select an input modality pair for entering a sequence of characters into the device. A complete set of characters of a keyboard are divided into a plurality of sets. A first modality among the pair enables selection of a character set among the plurality of character sets and a second modality enables selecting a character from the selected character set. The plurality of modalities comprise a touch mode defined by a set of touch based gestures, a motion keyboard mode defined by a set of device tilt based gestures, an air gesture mode defined by a set of virtual gestures and a voice mode defined by a set of voice commands. The input modality pair from among the plurality of input modalities is selected by the user based on physical constraints of the user (such as Visually Impaired (VI) or physical disability of hand movement) and environmental constraints posed by an environment around the device such as a (noisy environment). Further, the method disclosed utilizes a predefined vibration pattern to indicate the character set and the characters to the user. Thus, the vibration patterns provide a haptic response as feedback to users which cannot be easily captured by an imposter and hence provide higher security unlike voice based on visual keyboard based input mechanism.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a functional block diagram of a device 100, for multimodal input mechanism, in accordance with some embodiments of the present disclosure.

In an embodiment, the device 100, interchangeably referred as system 100 hereinafter, includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of device 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers and the like.

The I/O interface(s) 106 can include a variety of software and hardware interfaces, for example, a web interface, a graphical user interface, a touch user interface (TUI), voice interface and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108, which may store the preconfigured input modalities, the plurality of character sets and corresponding unique characters within each of the character sets and the like. The memory 102 may comprise information pertaining to input(s)/output(s) of each step performed by the processor(s) 104 of the device 100 and methods of the present disclosure. In an embodiment, the database 108 may be external (not shown) to the system 100 and coupled to the system via the I/O interface 106. Functions of the components of the device 100 are explained in conjunction with flow diagram of FIGS. 2A and 2B for multimodal input mechanisms and use case examples as depicted in FIGS. 3A through 4.

Figure 2A:
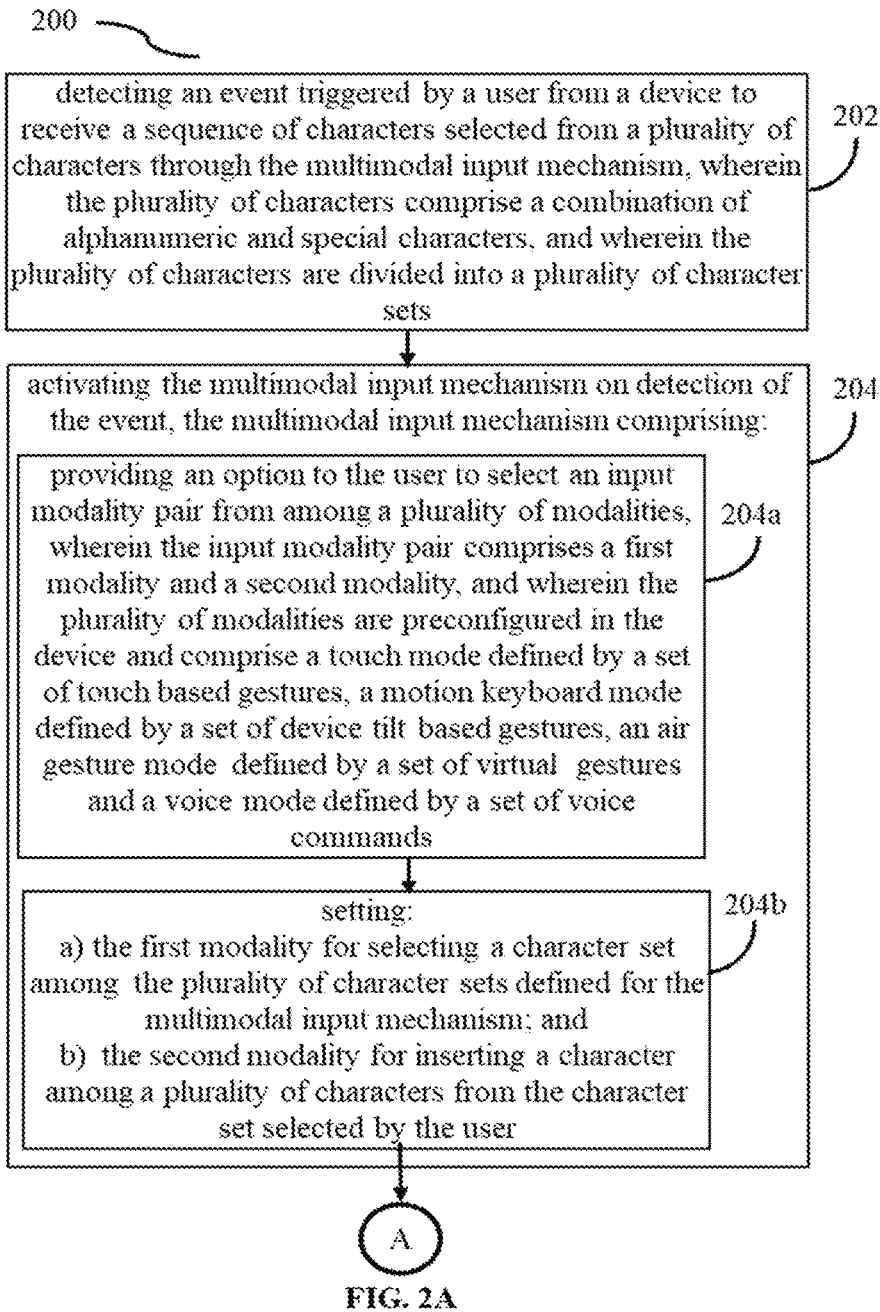
FIG. 2A and FIG. 2B are flow diagrams illustrating a method for multimodal input mechanism, using the device of FIG. 1, in accordance with some embodiments of the present disclosure.
Figure 2B:
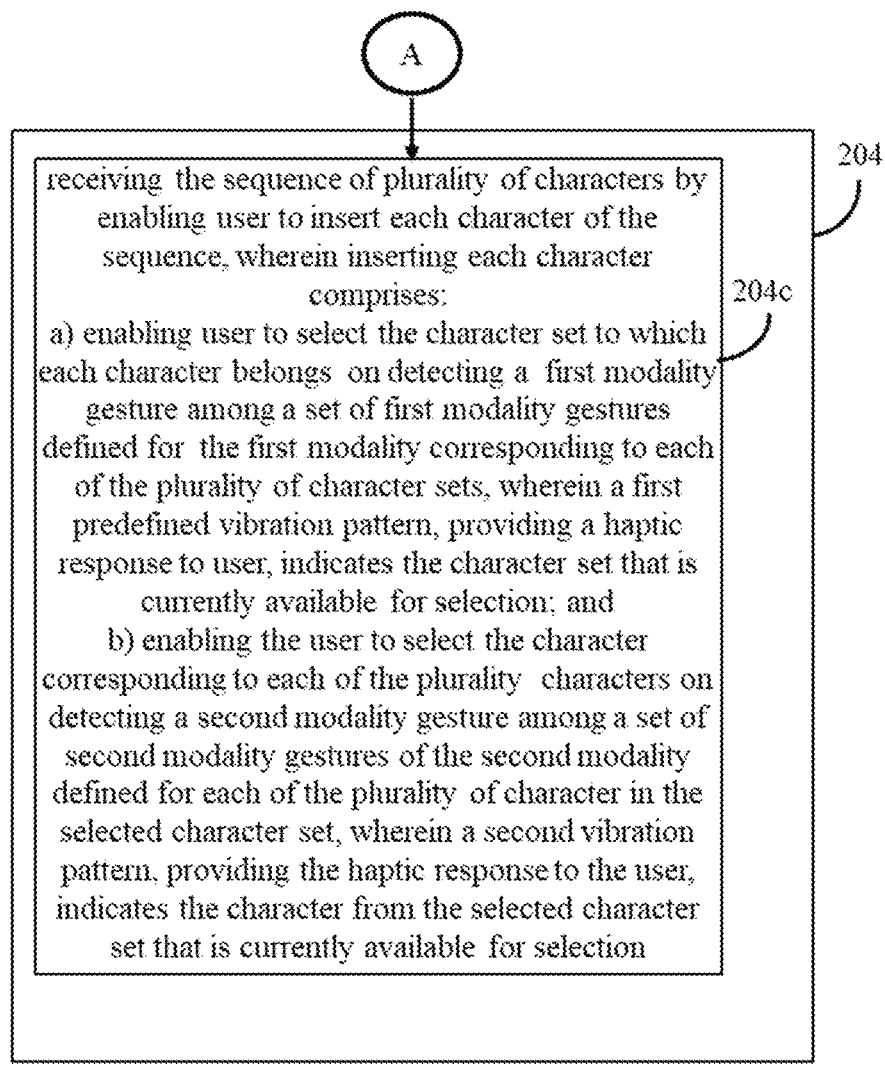
Figure 3A:
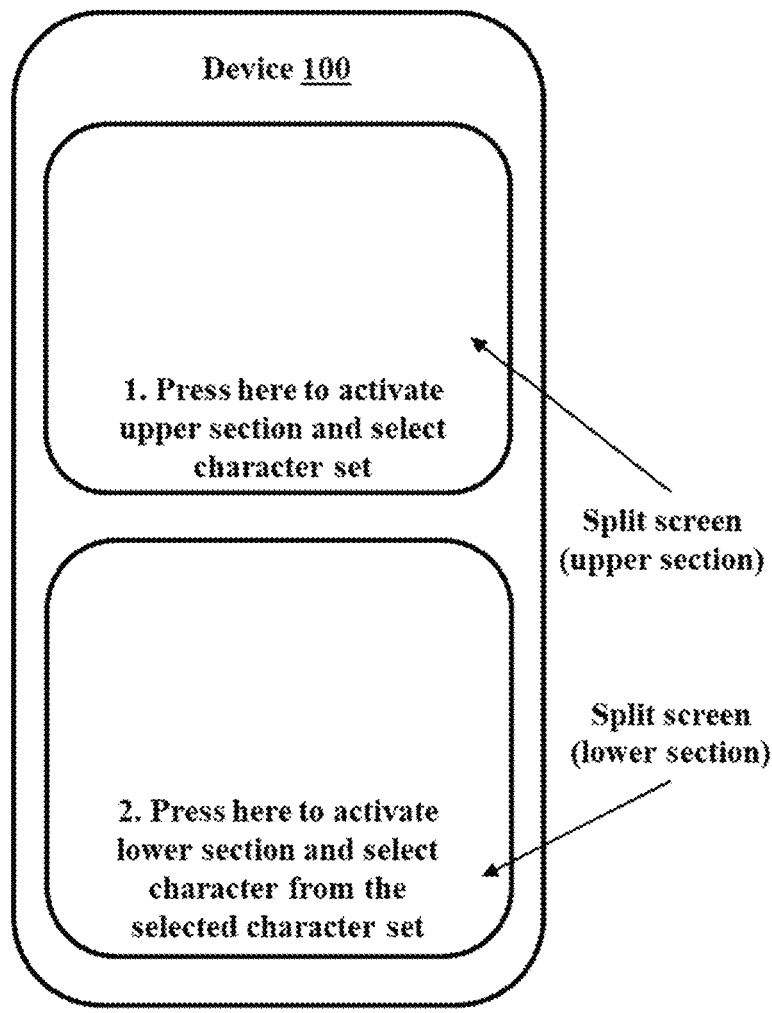
FIG. 3A through FIG. 3C is an illustrative example for a touch mode based input modality for a password based authentication using the device of FIG. 1, in accordance with some embodiments of the present disclosure.

FIG. 2A and FIG. 2B are flow diagrams illustrating a method for multimodal input mechanism, using the device 100 of FIG. 1, in accordance with some embodiments of the present disclosure. In an embodiment, the device 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the device 100 as depicted in FIG. 1 and the steps of flow diagram as depicted in FIG. 2A and FIG. 2B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202, the one or more hardware processors 104 are configured to detect an event, triggered by a user from the device 100, to receive a sequence of characters selected from a plurality of characters via the multimodal input mechanism. The plurality of characters comprise a combination of alphanumeric and special characters and are divided into the plurality of character sets comprising a first set {Set 1—Numeric (1-9 and 0)}, a second set {Set 2—Alphabets (a-i)}, a third set {Set 3—Alphabets set 2 (j-r)}, a fourth set {Set 4—Alphabets set 3 (s-z)}, a fifth set {Set 5—Special Characters symbol set} and a sixth set {Set 6—Special Characters symbol set}.

TABLE 1

| Set 1 Numeric | Set 2 Alphabets | Set 3 Alphabets | Set 4 Alphabets | Set 5 Special Characters Symbol | Set 6 Special Characters symbol |
|---|---|---|---|---|---|
| 1 | a | j | s | ! (.) | _ (") |
| 2 | b | k | t | @ (,) | - (') |
| 3 | c | l | u | # (?) | + ({) |
| 4 | d | m | v | $ (/) | = (}) |
| 5 | e | n | w | % (:) | ( ([) |
| 6 | f | o | x | ^ (;) | ) (]) |
| 7 | g | p | y | & (<) | ~ (\|) |
| 8 | h | q | z | * (>) | ' (\\) |
| 9 | i | r | | | |
| 0 | | | | | |

At step 204, the one or more hardware processors 104 are configured to activate the multimodal input mechanism on detection of the event. The multimodal input mechanism is explained in conjunction with steps 204a through 204c below:

i) Providing (204*a*) an option to the user to select an input modality pair from among the plurality of modalities, wherein the input modality pair comprises a first modality and a second modality. The plurality of modalities, which are preconfigured in the device 100 and comprise the touch mode defined by the set of touch based gestures, the motion keyboard mode defined by the set of device tilt based gestures, the air gesture mode defined by the set of virtual gestures and the voice mode defined by the set of voice commands. The input modality pair from among the plurality of modalities is selected by the user based on physical constraints of the user and environmental constraints posed by an environment around the device. For example, the user can prefer using combination of the motion keyboard and the touch mode when in a noisy environment rather than the voice mode. In another example, consider a user with finger disability (fingers damaged), which limits his ability to use air gestures or touch mode. Such user can prefer the motion keyboard mode that is based on device tilt gestures or may prefer a voice mode if environment is quiet, user is alone or has a headphone. In another scenario, where, the information entered is not sensitive, the voice mode can be chosen without any hesitation. Few use case examples for the multimodal input mechanism are explained in conjunction with FIGS. 3A through 4.

ii) Setting (204*b*):
  a) the first modality for selecting a character set among a plurality of character sets defined for the multimodal input mechanism; and
  b) the second modality for inserting a character among a plurality of characters from the character set selected by the user.

iii) Receiving (204*c*) the sequence of plurality of characters by enabling user to insert each character of the sequence, wherein inserting each character comprises:
  a) enabling user to select the character set to which each character belongs on detecting a first modality gesture among a set of first modality gestures defined for the first modality corresponding to each of the plurality of character sets, wherein a first predefined vibration pattern, providing a haptic response to user, indicates the character set that is currently available for selection; and
  b) enabling the user to select the character corresponding to each of the plurality characters on detecting a second modality gesture among a set of second modality gestures of the second modality defined for each of the plurality of character in the selected character set, wherein a second vibration pattern, providing the haptic response to the user, indicates the character from the selected character set that is currently available for selection.

An use case example explaining steps of receiving the sequence of plurality of characters when the user selects combination (hybrid mode) of input modalities is provided. In example herein he motion keyboard mode is selected as the first modality and the touch mode as the second modality. The steps comprise:
  i) enabling the user to select the character set among the plurality of character sets using the first modality gesture (for example, by tilting the device towards a first side) among the set of device tilt based gestures defined for the motion keyboard mode in accordance with the first vibration pattern;
  ii) enabling the user to insert each of the plurality of characters one at a time from the selected character set using the second modality gesture performed anywhere on the screen among the set of touch based gestures (such as 'touch start' and 'touch release' gestures) defined for the touch mode in accordance with the second vibration pattern;
    a) Enabling the user to toggle between opening and closing of a CAPSLOCK functionality by performing a next first modality gesture (for example by tilting the device on a second side) from the set of device tilt based gestures of the motion keyboard mode by activating the upper section. It can be understood that the CAPSLOCK functionality is applicable for the special characters represented in Set-5 and Set-6. Thus, with the CAPSLOCK activated for Set-5 special characters mentioned within the brackets such as (.) (,) (?) (/) (:) (;) (<) (>) are selected and with CAPSLOCK deactivated ! @ # $ % ^ & * are selected for a corresponding vibration. Similarly, for Set-6 CAPLOCK if activated selects special characters mentioned within brackets such as (") (')({) (}) ([) (]) (|) (\) and CAPSLOCK if deactivated selects _ - + = ( ) ~ ' for corresponding vibration.
    b) Enabling the user to delete a last inserted character by performing a next second modality gesture (for example by dragging finger from right to left) from the set of touch based gestures of the touch mode.

The method disclosed herein generates the first vibration pattern and the second vibration pattern by providing modifications to pattern generation for haptic response as suggested in a technical paper "TouchPIN: Numerical Passwords You Can Feel by Gesu". The technical paper mentioned herein has limitations on the characters that can be keyed in and does not provide options for:
1. Entering '0'
2. Entering upper case and lower case alphabets.
3. Entering special characters The method disclosed provides additional character sets (Set 5 and Set 6 of special character) which can be selected by user when he opts for the fifth and sixth vibration respectively after a get-set vibration. Further, the method disclosed modifies Set 1, to include '0' as a tenth character with tenth vibration after the get-set vibration corresponding to '0'. The vibration pattern generated are further explained in conjunction with use case examples of FIGS. 3A through 4C.

Provided is an use case example of entering a password Tcs@12 via the device (100) (referred as phone in the example herein), where a combination of two input modalities (interchangeably referred as hybrid mode) are used to select the character set and then select a character from the set. The use case example can be understood in conjunction with vibration patterns explained in FIGS. 3B and 3C for the password 'Tcs@12'

The hybrid mode uses motion keyboard mode (first modality) to activate or select the character set and the touch mode (second modality) to insert a character. Tilt device downside (a gesture from set of first modality gestures) is used to activate a charter set, while touch gesture performed on the screen of the device 100 (gesture from the set of second modality gestures) is used to insert a character. Tilt device upside is used to toggle between caps lock ON or OFF. Drag the finger from right to left to delete last entered digit.

In order to learn the character sets the user needs to just remember starting alphabet of each set, which is "1 a j s" and according to the character they want to type, the user needs to activate the corresponding set. For the special characters, user is expected to remember the sequence of special characters in each set. However, the method disclosed arranges the sequence of characters so that they are learnt and recalled by user with ease.

There are two steps to enter any character:

1. Activate or Select desired character set—First activate the character set that you want to enter e.g. If user wants to enter "f", then activate set 2 Alphabets (a-i).

2. Enter character—After activation user needs to traverse to the required character set (For example to type "f"—skip "get-set vibration and lift finger after 6 vibrations) and lift finger to keying (selecting) the character.

3) Insert 'T'

Step 1: Activate set 4 (Alphabetic set 3)—Tilt phone downside to activate the character set. Skip "get-set" vibration then move phone back to starting position after 4th vibration.

Step 2: Open Caps lock—Tilt phone upside then move back to starting position to activate the Caps lock.

Step 3: Insert T—Place the finger on the screen to start the vibrations, skip "get-set" vibration and lift finger after 2nd vibration to key in "T" i.e., S T Insert 'c'

Step 1: Activate set 2 (Alphabetic set 1)—Tilt phone downside to activate the character set. Skip "get-set" vibration then move phone back to starting position after 2nd vibration.

Step 2: Close Caps lock—Tilt phone upside then move back to starting position to turn off the Caps lock.

Step 3: Insert c—Place the finger on the screen to start the vibrations, skip "get-set" vibration and lift finger after 3rd vibration to keying "c" i.e. a b c.

Insert 's':

Step 1: Activate set 4 (Alphabetic set 3)—Tilt phone downside to activate the character set. Skip "get-set" vibration then move phone back to starting position after 4th vibration.

Step 2: Insert 's'—Place the finger on the screen to start the vibrations, skip "get-set" vibration and lift finger after 1st vibration to keying "s".

Insert '@'

Step 1: Activate set 5 (Special Symbol set 1)—Tilt phone downside to activate the character set. Skip "get-set" vibration then move phone back to starting position after 5th vibration.

Step 2: Insert @—Place the finger on the screen to start the vibrations, skip "get-set" vibration and lift finger after 2nd vibration to keying "@".

Insert '1'

Step 1: Activate set 1 (Numeric set)—Tilt phone downside to activate the character set. Skip "get-set" vibration then move phone back to starting position after 1st vibration.

Step 2: Insert 1—Place the finger on the screen to start the vibrations, skip "get-set" vibration and lift after 1st vibration.

Insert '2'

Step 1: Insert 2—Place the finger on the screen to start the vibrations, skip "get-set" vibration and lift after 2nd vibration.

Figure 3B:
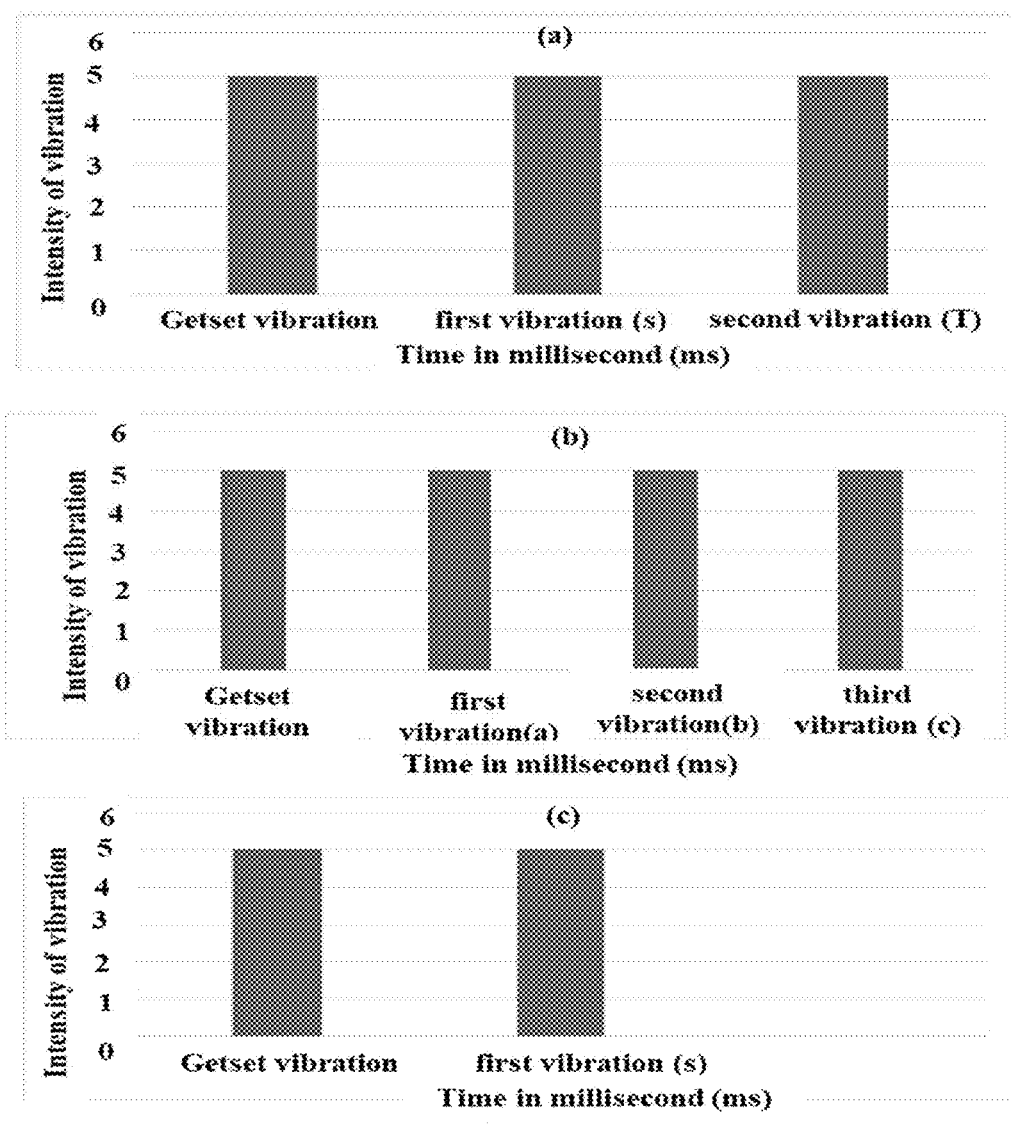
Figure 3C:
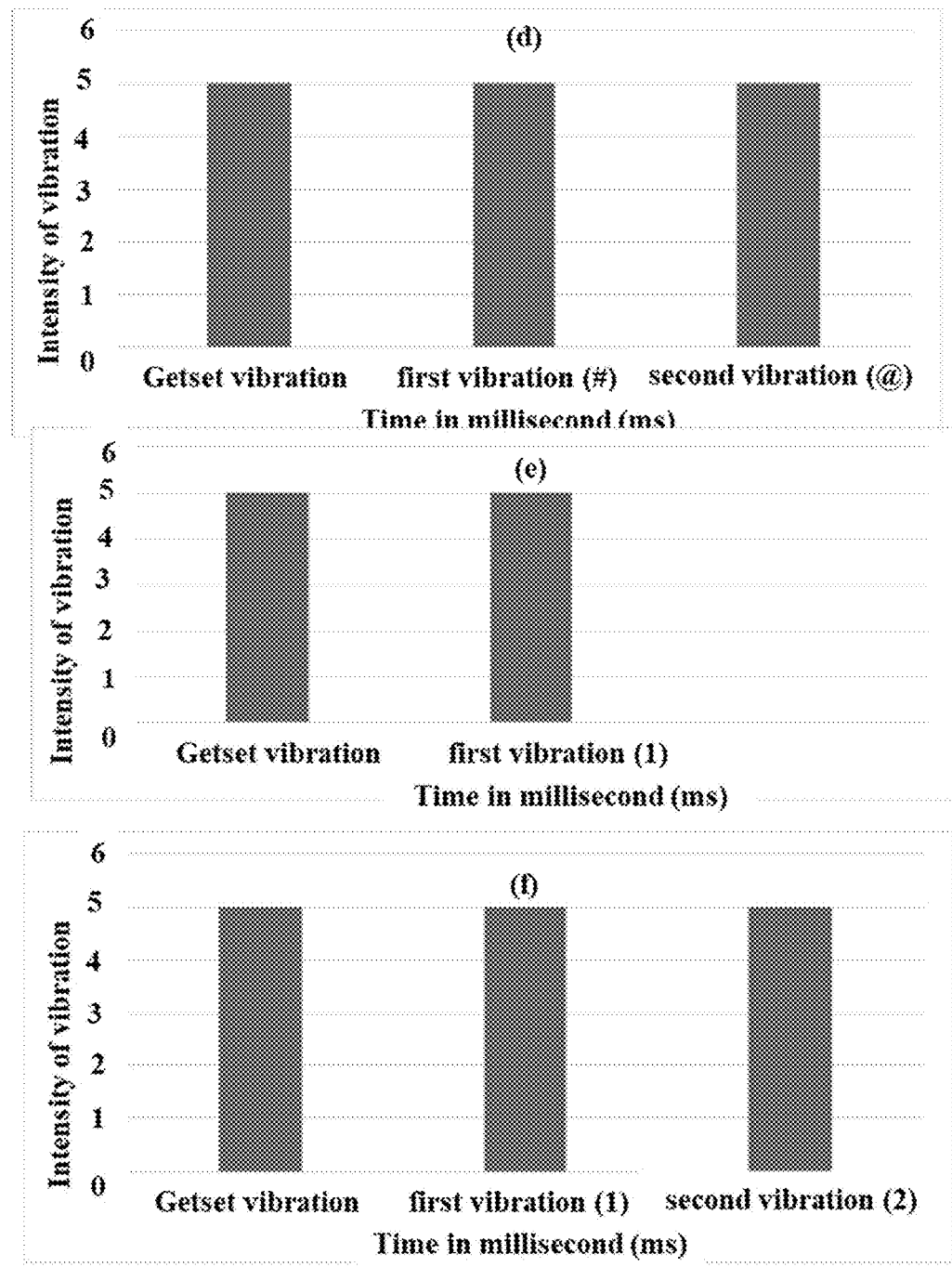
Figure 4:
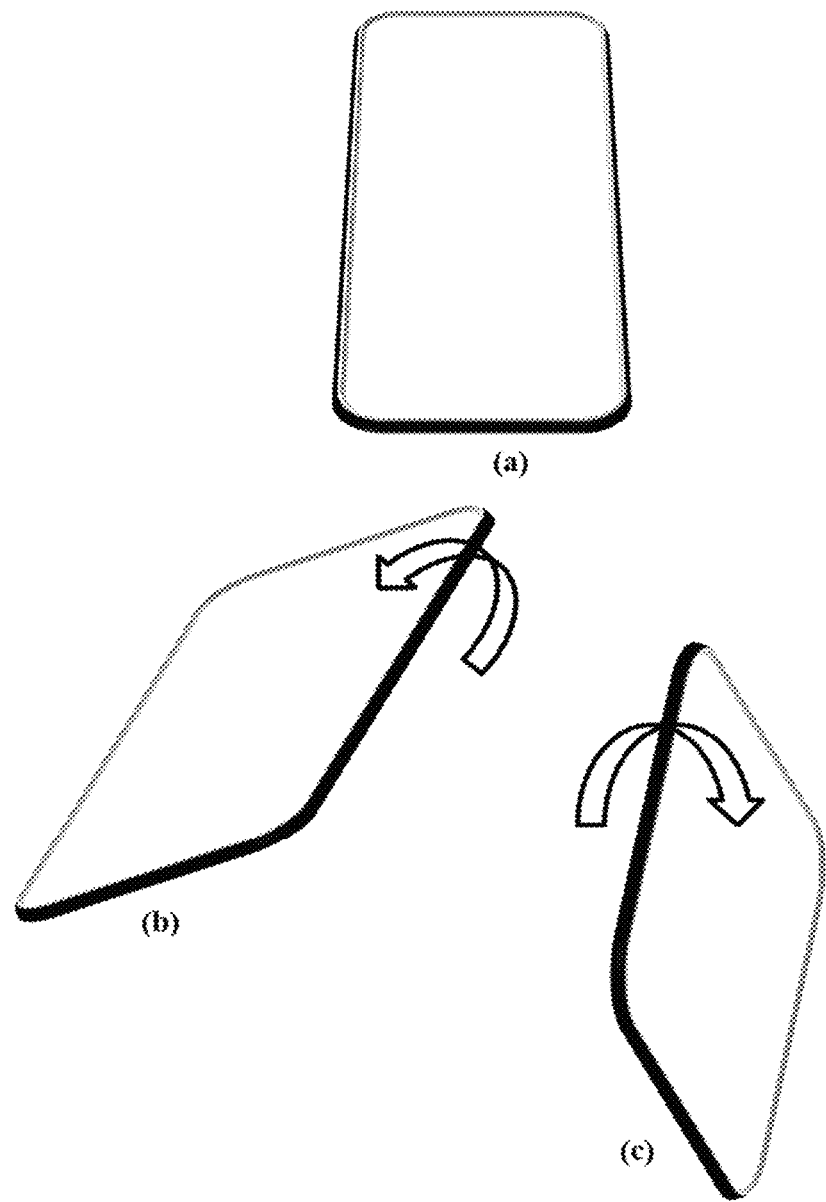
FIG. 4 is an illustrative example fora motion keyboard based input modality for a password based authentication using the device of FIG. 1, in accordance with some embodiments of the present disclosure.

FIG. 3A through FIG. 3C is an illustrative example for a touch mode based input modality for a password based authentication using the device of FIG. 1, in accordance with some embodiments of the present disclosure. The sequence of steps for entering the sequence of characters is explained herein with 'password' entry in an authentication scenario. However, the method disclosed can be utilized in any application where entering of characters in a sequence is desired.

Use case Example—Enter Password: Tcs@12 with first modality and second modality selected as touch mode. In the touch mode, interchangeably referred as touch keyboard, the keypad (touch sensitive screen of the device 100) is divided into an upper section and a lower section as shown by split screen generated by splitting the screen of the device 100. Refer FIG. 3A. Upper section is to activate (select) the character set and lower portion is to key-in (select) the desired character for insertion. For Caps Lock: Double tap on the screen is used to toggle between caps lock. For Deletion: To delete last entered digit drag your finger from right to left.

Steps to insert 'T' (upper case)

Step 1: Activate set 4 (Alphabetic set 3): When the user places the finger on the upper section of the keyboard, the vibrations starts. The system gives "get-set" vibration followed by the "pause" of variable duration. To type T, activate the "s" set character set by lifting the finger after 4th vibration.

Step 2: Turn Caps lock on by Double tap on the screen.

Step 3: Insert T: Place the finger in the lower section of the keyboard to start the vibrations, skip the "get-set" vibration and lift finger after 2nd vibration to input "T" i.e. S T. [Refer FIG. 3B (a)]

Steps to insert 'c' (lower case)

Step 1: Activate set 2 (Alphabetic set 1)—Place the finger on the upper section of the keyboard, the vibrations will start, skip the "get-set" vibration and lift the finger after 2nd vibration to activate "a" i.e. 2nd character set.

Step 2: Close Caps lock—Double tap on the screen.

Step 3: Insert c-Place the finger on the lower section of the keyboard, the vibrations start, skip the "get-set" vibration and lift the finger after 3rd vibration to input "c" i.e. a b c. [Refer FIG. 3B (b)]

Insert 's':

Step 1: Activate set 4 (Alphabetic set 3)—Place the finger on the upper section of the keyboard to activate the "s" character set. Skip the "get-set" vibration and lift the finger after 4th vibration to activate the "s" set i.e. 4th character set. [Refer FIG. 3B (a)]

Step 2: Insert s—Place the finger on the lower section of the keyboard to start the vibrations, skip the "get-set" vibration then lift finger after 1st vibration to input "s". [Refer FIG. 3B (c)]

Insert '@':

Step 1: Activate set 5 (Special Symbol set 1)—Place the finger on the upper section of the keyboard to activate the 1st special symbol set. Skip the "get-set" vibration and lift the finger after 5th vibration to activate.

Step 2: Insert @—Place the finger on the lower section of the keyboard to start the vibrations, skip the "get-set" vibration then lift finger after 2nd vibration to key in "@". [Refer FIG. 3B (d)]

Insert '1':

Step 1: Activate set 1 (Numeric set)—Place the finger on the upper section of the keyboard to activate the numeric set i.e. lift after 1st main vibration.

Step 2: Insert 1—Place the finger on the lower section of the keyboard to start the vibrations, skip the "get-set" vibration, and left the finger after 1st vibration to keying "1". [Refer FIG. 3B (e)]

Insert '2'
Step 1: Insert 2—Place the finger on the lower section of the keyboard to start the vibrations, skip the "get-set" vibration, and left the finger after 2nd vibration to keying "2". [Refer FIG. 3B (f)].

It can be noted that since the method disclosed provides a split screen, the device 100 can differentiate between repeated multiple touch gestures and distinctly identify where they are for character set selection or character selection. Typical example is a case when user intends to select multiple characters from the same set. For example, 1 and 2 from the numeric Set-1.

FIG. 4 is an illustrative example for a motion keyboard based input modality for a password based authentication using the device 100 of FIG. 1, in accordance with some embodiments of the present disclosure. The set of first modality gestures and second modality gestures for the motion keyboard mode, in the example herein, can be:

1. Device position parallel to ground (flat), as depicted in FIG. 4 (a), is an initial or reference position of the motion keyboard mode.
2. Tilt device (phone) towards left is used to activate a character set.
3. Tilt device towards right is used to insert a character.
4. Tilt device upside is used to toggle between caps lock open and close.
5. Tilt device downside is used to delete last inserted character.

Insert 'T'
Step 1: Activate set 4 (Alphabetic set 3)—Tilt phone towards left to activate character set "s"(3) [Refer FIG. 4 (a)], skip the "get-set" vibration then move phone back to starting position after 4th vibration.
Step 2: Open Caps lock—Tilt phone upside to activate Caps lock, then move to starting position.
Step 3: Insert T—To key in the character, tilt the phone towards right [Refer FIG. 4 (b)]. Skip the "get-set" vibration and return the phone to the starting position after 2nd vibration to keying "T" i.e. S T.

Insert 'c'
Step 1: Activate set 2 (Alphabetic set 1)—Tilt phone towards left to activate the character set 2 [Refer FIG. 4 (a)], skip the "get-set vibration then move phone back to starting position after 2nd vibration.
Step 2: Close Caps lock—Tilt phone upside to turn off the Caps lock, then move to starting position.
Step 3: Insert c—To keying "c", tilt the phone towards right [Refer FIG. 4 (b)]. Skip the "get-set" vibration and return the phone to the starting position after the 3rd vibration i.e. a b c.

Insert 's'
Step 1: Activate set 4 (Alphabetic set 3)—Tilt phone towards left to activate character set "s"(3), skip the "get-set" vibration then move phone back to starting position after 4th vibration.
Step 2: Insert s—To key in the character, tilt the phone towards right. Skip the "get-set" vibration and return the phone to the starting position after 2nd vibration to keying "s".

Insert '@'
Step 1: Activate set 5 (Special Symbol set 1)—Tilt phone towards left to activate special character set. skip the "get-set" vibration then move phone back to starting position after 5th vibration.
Step 2: Insert @—To key in the character "@", tilt the phone towards right. Skip the "get-set" vibration and return the phone to the starting position after 2nd vibration.

Insert '1'
Step 1: Activate set 1 (Numeric set)—Tilt phone towards left to activate numeric character set. skip the "get-set" vibration then move phone back to starting position after 1st vibration.
Step 2: Insert 1—To key in the character "1", tilt the phone towards right. Skip the "get-set" vibration and return the phone to the starting position after 1st vibration.

Insert '2'
Step 1: Insert 2—To key in the character "@", tilt the phone towards right. Skip the "get-set" vibration and return the phone to the starting position after 2nd vibration i.e. 1 2.

In an embodiment, additional audio/visual feedback option can be provided to the user for letting the user know the character set user has currently selected and letting user know which position character is the user keying-in. The option can be turned on or off based on the requirement of the user. However, the audio/visual feedback is muted while the actual character is selected and keyed-in, thus not revealing the password characters entered and providing protection from any imposter present in the surrounding. This option may be convenient and handy when user is distracted while entering a long sequence of characters and needs a quick reference to identify where he had left the action.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method providing a multimodal input mechanism, the method comprising:
   detecting, by one or more hardware processors, an event triggered by a user from a device to receive a sequence of characters selected from a plurality of characters through the multimodal input mechanism, wherein the plurality of characters comprise a combination of alphanumeric and special characters, and wherein the plurality of characters are divided into a plurality of character sets;
   activating, via the one or more hardware processors, the multimodal input mechanism on detection of the event, the multimodal input mechanism comprising:
      providing an option to the user to select an input modality pair from among a plurality of modalities, wherein the input modality pair comprises a first modality and a second modality, and wherein the plurality of modalities are preconfigured in the device and comprise a touch mode defined by a set of touch based gestures, a motion keyboard mode defined by a set of device tilt based gestures, an air gesture mode defined by a set of virtual gestures and a voice mode defined by a set of voice commands;
   setting:
      a) the first modality for selecting a character set among the plurality of character sets defined for the multimodal input mechanism; and
      b) the second modality for inserting a character among a plurality of characters from the character set selected by the user; and
   receiving the sequence of plurality of characters by enabling user to insert each character of the sequence, wherein inserting each character comprises:
      a) enabling user to select the character set to which each character belongs on detecting a first modality gesture among a set of first modality gestures defined for the first modality corresponding to each of the plurality of character sets, and wherein a first predefined vibration pattern, providing a haptic response to user, indicates the character set that is currently available for selection; and
      b) enabling the user to select the character corresponding to each of the plurality characters on detecting a second modality gesture among a set of second modality gestures of the second modality defined for each of the plurality of character in the selected character set, and wherein a second vibration pattern, providing the haptic response to the user, indicates the character from the selected character set that is currently available for selection.

2. The method of claim 1, wherein steps of receiving the sequence of plurality of characters, when the user selects the motion keyboard mode as the first modality and the touch mode as the second modality, comprise:
   a) enabling the user to select the character set among the plurality of character sets using the first modality gesture among the set of device tilt based gestures defined for the motion keyboard mode in accordance with the first vibration pattern;
   b) enabling the user to insert each of the plurality of characters one at a time from the selected character using the second modality gesture performed on a screen of the device among the set of touch based gestures defined for the touch mode in accordance with the second vibration pattern;
   c) enabling the user to toggle between opening and closing of a CAPSLOCK functionality by performing a next first modality gesture from the set of device tilt based gestures of the motion keyboard mode by activating the upper section; and
   d) enabling the user to delete a last inserted character by performing a next second modality gesture from the set of touch based gestures of the touch mode.

3. The of claim 1, wherein the plurality of character sets comprises a first set {Set 1—Numeric (1-9 and 0)}, a second set {Set 2—Alphabets (a-i)}, a third set {Set 3—Alphabets set 2 (j-r)}, a fourth set {Set 4—Alphabets set 3 (s-z)}, a fifth set {Set 5—Special Characters symbol set} and a sixth set {Set 6—Special Characters symbol set}.

4. The method of claim 1, wherein the input modality pair from among the plurality of modalities is selected by the user based on physical constraints of the user and environmental constraints posed by an environment around the device.

5. A device for multimodal input mechanism, the device comprising:
a memory storing instructions;
one or more Input/Output (I/O) interfaces; and
one or more hardware processors coupled to the memory via the one or more I/O interfaces, wherein the one or more hardware processors are configured by the instructions to:
detect an event triggered by a user from a device to receive a sequence of characters selected from a plurality of characters through the multimodal input mechanism, wherein the plurality of characters comprise a combination of alphanumeric and special characters, and wherein the plurality of characters are divided into a plurality of character sets;
activate the multimodal input mechanism on detection of the event, the multimodal input mechanism comprising:
providing an option to the user to select an input modality pair from among a plurality of modalities, wherein the input modality pair comprises a first modality and a second modality, and wherein the plurality of modalities are preconfigured in the device and comprise a touch mode defined by a set of touch based gestures, a motion keyboard mode defined by a set of device tilt based gestures, an air gesture mode defined by a set of virtual gestures and a voice mode defined by a set of voice commands;
setting:
a) the first modality for selecting a character set among the plurality of character sets defined for the multimodal input mechanism; and
b) the second modality for inserting a character among a plurality of characters from the character set selected by the user; and
receiving the sequence of plurality of characters by enabling user to insert each character of the sequence, wherein inserting each character comprises:
a) enabling user to select the character set to which each character belongs on detecting a first modality gesture among a set of first modality gestures defined for the first modality corresponding to each of the plurality of character sets, and wherein a first predefined vibration pattern, providing a haptic response to user, indicates the character set that is currently available for selection; and
b) enabling the user to select the character corresponding to each of the plurality characters on detecting a second modality gesture among a set of second modality gestures of the second modality defined for each of the plurality of character in the selected character set, and wherein a second vibration pattern, providing the haptic response to the user, indicates the character from the selected character set that is currently available for selection.

6. The device of claim 5, wherein the device is configured to receive the sequence of plurality of characters, when the user selects the motion keyboard mode as the first modality and the touch mode as the second modality by:
a) enabling the user to select the character set among the plurality of character sets using the first modality gesture among the set of device tilt based gestures defined for the motion keyboard mode in accordance with the first vibration pattern;
b) enabling the user to insert each of the plurality of characters one at a time from the selected character set using the second modality gesture performed on a screen of the device among the set of touch based gestures defined for the touch mode in accordance with the second vibration pattern;
c) enabling the user to toggle between opening and closing of a CAPSLOCK functionality by performing a next first modality gesture from the set of device tilt based gestures of the motion keyboard mode by activating the upper section; and
d) enabling the user to delete a last inserted character by performing a next second modality gesture from the set of touch based gestures of the touch mode.

7. The device of claim 5, wherein the plurality of character sets comprise a first set {Set 1—Numeric (1-9 and 0)}, a second set {Set 2—Alphabets (a-i)}, a third set {Set 3—Alphabets set 2 (j-r)}, a fourth set {Set 4—Alphabets set 3 (s-z)}, a fifth set {Set 5—Special Characters symbol set} and a sixth set {Set 6—Special Characters symbol set}.

8. The device of claim 5, wherein the input modality pair from among the plurality of modalities is selected by the user based on physical constraints of the user and environmental constraints posed by an environment around the device.

9. One or more non-transitory machine-readable information storage mediums comprising one or more instructions, which when executed by one or more hardware processors causes a method for multimodal input mechanism, the method comprising:
detecting an event triggered by a user from a device to receive a sequence of characters selected from a plurality of characters through the multimodal input mechanism, wherein the plurality of characters comprise a combination of alphanumeric and special characters, and wherein the plurality of characters are divided into a plurality of character sets;
activating the multimodal input mechanism on detection of the event, the multimodal input mechanism comprising:
providing an option to the user to select an input modality pair from among a plurality of modalities, wherein the input modality pair comprises a first modality and a second modality, and wherein the plurality of modalities are preconfigured in the device and comprise a touch mode defined by a set of touch based gestures, a motion keyboard mode defined by a set of device tilt based gestures, an air gesture mode defined by a set of virtual gestures and a voice mode defined by a set of voice commands;
setting:
a) the first modality for selecting a character set among the plurality of character sets defined for the multimodal input mechanism; and
b) the second modality for inserting a character among a plurality of characters from the character set selected by the user; and
receiving the sequence of plurality of characters by enabling user to insert each character of the sequence, wherein inserting each character comprises:
a) enabling user to select the character set to which each character belongs on detecting a first modality gesture among a set of first modality gestures defined for the first modality corresponding to each of the plurality of character sets, and wherein a first predefined vibration pattern, providing a haptic response to user, indicates the character set that is currently available for selection; and b) enabling the user to select the character corresponding to each of the plurality characters on detecting a second modality gesture among a set of second modality gestures of the second modality defined for each of the plurality of character in the selected character set, and wherein a second vibration pattern, providing the haptic response to the user, indicates the character from the selected character set that is currently available for selection.

10. The one or more non-transitory machine-readable information storage mediums of claim 9, wherein steps of receiving the sequence of plurality of characters, when the user selects the motion keyboard mode as the first modality and the touch mode as the second modality, comprises:

a) enabling the user to select the character set among the plurality of character sets using the first modality gesture among the set of device tilt based gestures defined for the motion keyboard mode in accordance with the first vibration pattern;

b) enabling the user to insert each of the plurality of characters one at a time from the selected character using the second modality gesture performed on a screen of the device among the set of touch based gestures defined for the touch mode in accordance with the second vibration pattern;

c) enabling the user to toggle between opening and closing of a CAPSLOCK functionality by performing a next first modality gesture from the set of device tilt based gestures of the motion keyboard mode by activating the upper section; and d) enabling the user to delete a last inserted character by performing a next second modality gesture from the set of touch based gestures of the touch mode.

11. The one or more non-transitory machine-readable information storage mediums of claim 9, wherein the plurality of character sets comprise a first set {Set 1—Numeric (1-9 and 0)}, a second set {Set 2—Alphabets (a-i)}, a third set {Set 3—Alphabets set 2 (j-r)}, a fourth set {Set 4—Alphabets set 3 (s-z)}, a fifth set {Set 5—Special Characters symbol set} and a sixth set {Set 6—Special Characters symbol set}.

12. The one or more non-transitory machine-readable information storage mediums of claim 9, wherein the input modality pair from among the plurality of modalities is selected by the user based on physical constraints of the user and environmental constraints posed by an environment around the device.

* * * * *